US006431717B1

(12) United States Patent
Anderson et al.

(10) Patent No.: US 6,431,717 B1
(45) Date of Patent: Aug. 13, 2002

(54) KEYED WAVEGUIDE ASSEMBLY AND METHOD FOR MAKING SAME

(75) Inventors: James Burr Anderson; George Robert Hulse, both of Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/521,124

(22) Filed: Mar. 7, 2000

(51) Int. Cl.[7] ................................................. F21V 8/00
(52) U.S. Cl. ........................ 362/31; 362/485; 362/487
(58) Field of Search ................................ 362/485, 551, 362/559, 576, 153, 560, 146, 581; 385/902, 901, 146, 147, 143, 121

(56) References Cited

U.S. PATENT DOCUMENTS

| | | | |
|---|---|---|---|
| 4,282,560 A | 8/1981 | Kringel et al. ................. 362/26 |
| 4,325,606 A | 4/1982 | Ikuno et al. ................... 385/76 |
| 4,478,484 A | * 10/1984 | Pratt ........................... 385/88 |
| 4,510,005 A | 4/1985 | Nijiman ....................... 156/221 |
| 4,521,835 A | 6/1985 | Meggs et al. ................ 362/470 |
| 4,733,332 A | 3/1988 | Yamashita et al. ........... 362/582 |
| 4,751,617 A | * 6/1988 | Ryder et al. ................. 362/460 |
| 4,952,022 A | 8/1990 | Genovese .................... 385/16 |
| 5,343,543 A | * 8/1994 | Novak ......................... 385/31 |
| 5,346,655 A | 9/1994 | Blyler, Jr. et al. .......... 264/1.28 |
| 5,495,400 A | 2/1996 | Currie ......................... 362/551 |
| 5,573,327 A | * 11/1996 | Dealey ........................ 362/31 |
| 5,631,994 A | * 5/1997 | Appledorn ................... 385/147 |
| 5,659,643 A | 8/1997 | Appeldorn et al. ........... 385/31 |
| 5,678,914 A | * 10/1997 | Dealey ........................ 362/551 |
| 5,796,897 A | 8/1998 | Ronan .......................... 385/76 |
| 5,845,038 A | 12/1998 | Lundin et al. ................ 1/1 |
| 5,905,826 A | 5/1999 | Benson, Jr. et al. .......... 385/31 |

* cited by examiner

Primary Examiner—Sandra O'Shea
Assistant Examiner—Hargobind S. Sawhney
(74) Attorney, Agent, or Firm—Reising, Ethington, Barnes, Kisselle, Learman & McCulloch, P.C.

(57) ABSTRACT

An illumination assembly and a method for making it. The basic assembly includes an elongated waveguide and an enclosure operative to support an illumination source, where the enclosure defines at least one opening. The waveguide includes light-directing structure operative to direct light out of the waveguide in a pre-determined direction. The end of the waveguide and the opening of the enclosure are each shaped so that the waveguide may be inserted into the enclosure in only one rotational orientation. The method includes the basic steps of: modifying the waveguide to include light-directing structure along the waveguide to direct light out of the waveguide in a predetermined direction; forming an opening having a predetermined shape; and forming the end of the waveguide to have a corresponding shape, where the shapes of the opening and the end permit mating of the end into the opening in only one rotational orientation.

22 Claims, 2 Drawing Sheets

KEYED WAVEGUIDE ASSEMBLY AND METHOD FOR MAKING SAME

TECHNICAL FIELD

The present invention relates to illumination assemblies, and more particularly to illumination assemblies using waveguides.

BACKGROUND OF THE INVENTION

In the art of illumination assemblies, waveguides are sometimes used to project light onto a given target area. Some waveguides project the light omnidirectionally. But in some applications this is not desirable. Skilled practitioners know to manipulate the waveguide itself in some manner to direct light out of the waveguide in a predetermined direction. This is desirable in some applications to increase the light emanating from a portion of the waveguide. For example, if the waveguide is mounted against a surface, light directed at the surface can be wasted. If that light could be re-directed, it could be better used. One can direct light, for example, through the use of notching, paint, stippling, etc. Thus, in an elongated waveguide, the light can be controlled to emanate from the waveguide along its length through a given circumferential portion on the surface area of the waveguide. In other words, one can direct the light out in a given radial direction so that the light exits through just an arc of the surface area. Through the above-mentioned techniques, one can direct light out of predetermined portions of waveguides having shapes other than tubular shapes. And this has been done. But a problem sometimes arises when the waveguide—no matter what the shape—is assembled into a given operating location. Unless the assembler knows how the light will emanate from the waveguide, he might install the waveguide so that the light directed from the waveguide misses the desired target area.

SUMMARY OF THE INVENTION AND ADVANTAGES

An illumination assembly includes an enclosure operative to support an illumination source, where the enclosure defines at least one opening. The assembly further includes at least one elongated waveguide having a first end disposed in an opening of the enclosure, and a spaced-apart second end. The waveguide includes light-directing structure operative to direct light out of the waveguide in a pre-determined direction. The end of the waveguide and the opening of the enclosure are each shaped so that the waveguide may be inserted into the enclosure in only one rotational orientation.

This simplifies manufacturing and ensures that the waveguide will be installed correctly.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
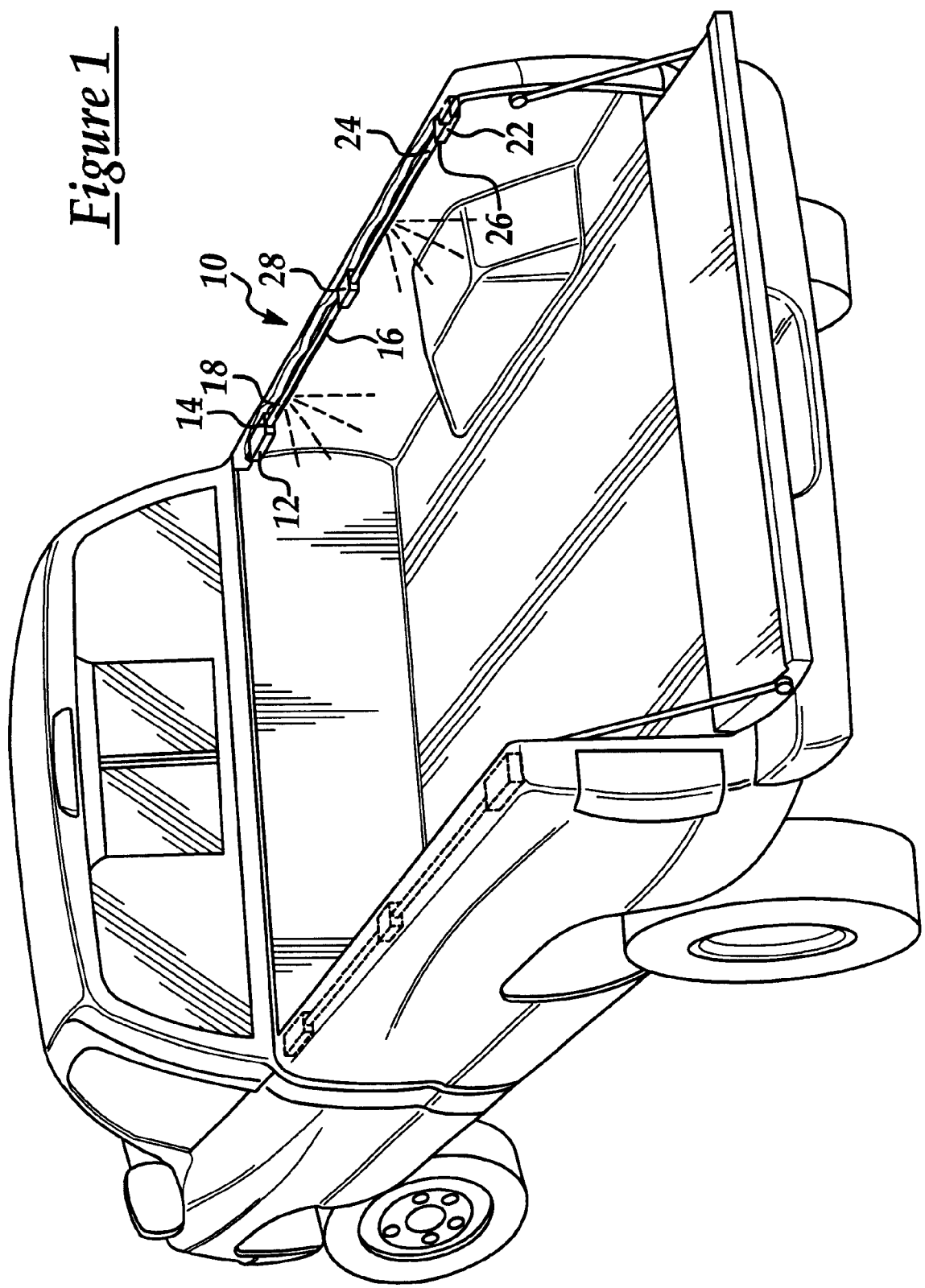
FIG. 1 is a perspective view of an embodiment of the invention shown in one operating location for illuminating a target area (e.g. a truck bed)

Referring to the Figures wherein like numerals indicate like or corresponding parts throughout the several views, an illumination assembly is generally shown at 10.

The illumination assembly 10 generally includes an illumination source enclosure 12, where the enclosure 12 defines at least one opening 14; and at least one elongated waveguide 16 having an end 18 disposed in an opening of the enclosure. The enclosure 12 can be any enclosure that supports any kind of illumination source. The illumination source is not critical to the present invention and will not be discussed in any detail. The waveguide 16 includes light-directing structure 20 operative to direct light out of the waveguide in a pre-determined direction. The end 18 of the waveguide 16 and the opening 14 are each shaped so that the waveguide may be inserted into the enclosure 12 in only one rotational orientation. This shaping of the waveguide 16 and the opening 14 may be referred to as "keying." It is the keying that ensures the proper and unique orientation of the waveguide 16 relative to the enclosure 12.

This is the basic assembly. There are many possible variations on this assembly that could involve multiple illumination source enclosures 12 and multiple waveguides 16.

For example, as shown in the embodiment of FIG. 1, there may be a second illumination source enclosure 22, where a second end 24 of the waveguide 16 is disposed in the opening 26 of this second enclosure. Here, the second end 24 could be keyed to match a keyed opening 26 in the second enclosure 22, although this is not necessary. This embodiment could further include a support 28 disposed along the waveguide 16 between the first enclosure 12 and the second enclosure 22. The support 28 is made from a material that permits light to pass through—i.e. a material that is either clear or translucent. Such materials are well-known to persons of skill in the art. Thus, when the waveguide 16 with the light-directing structure 20 is installed on the wall, it will light the intended target area—the truck bed—because the keying ensures proper alignment of the waveguide 16 in its intended environment.

In another possible embodiment (not shown), similar to that shown in FIG. 1, there could be two waveguides, each extending between an illumination source enclosure and a support, like the arrangement shown in FIG. 1. In an embodiment like this, the waveguides could have ends that key into the support—and not the illumination source enclosures.

In yet another possible embodiment (also not shown), the waveguide could be keyed in the middle, or at some location other than its ends, to mate with a support that is likewise keyed, so that when the waveguide and support are installed, the keying ensures the proper alignment between the waveguide and support.

Figure 2A:
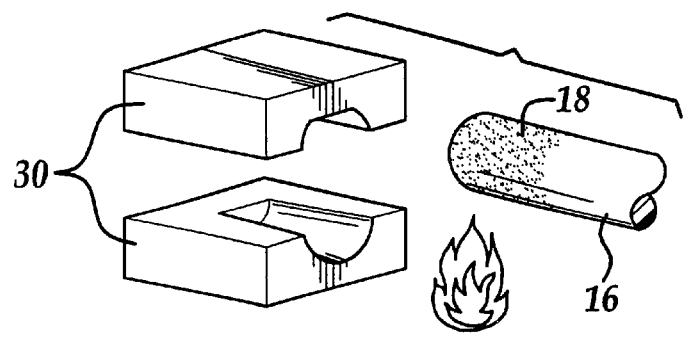
FIG. 2A is a perspective view of an end of a waveguide showing the end of the waveguide being heated prior to being inserted into a die.
Figure 2B:
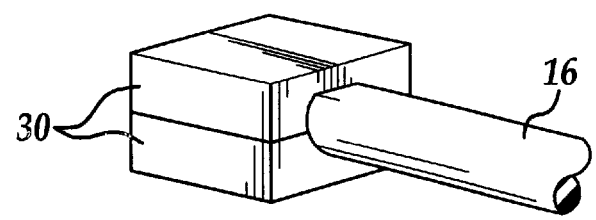
FIG. 2B is a perspective view of the waveguide showing the end disposed in a closed die for forming the end of the waveguide into the predetermined shape.
Figure 2C:
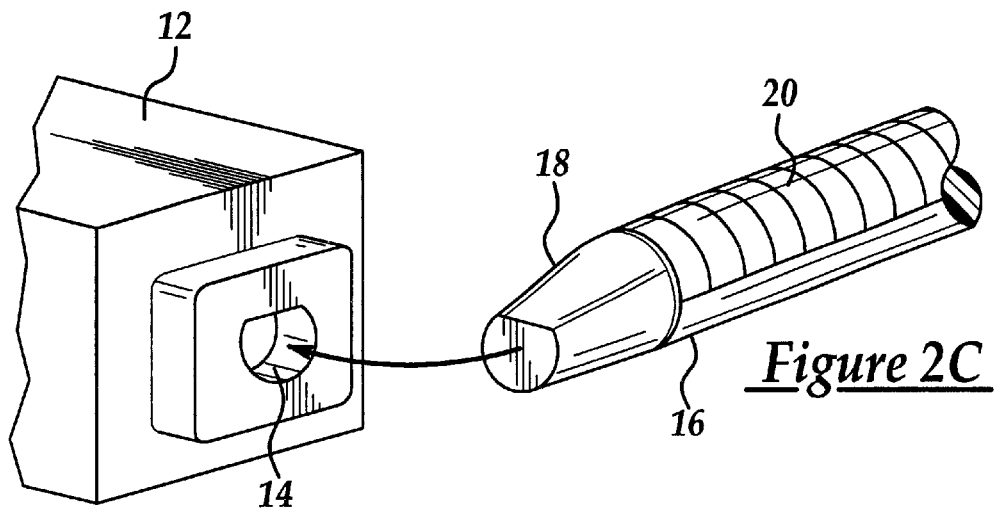
FIG. 2C is a perspective view of the end of the waveguide after the end has been formed, showing the manner in which the end fits into an enclosure.

Referring to embodiments of the type shown in FIG. 1, waveguide ends such as 18 can be molded or otherwise made to have a shape matching the shape of the opening such as 14. This is because the waveguide 16 is typically made from a thermoplastic material that can be heated and reformed. According to FIG. 2, the end 18 of the waveguide 16 is deformed from its original shape to a shape matching the shape of the opening 14 in the enclosure 12. This simple process is illustrated in FIGS. 2A and 2B, where the end 18 of the waveguide 16 is heated, then inserted into a die 30 that closes to mold or deform the end 18 of the waveguide 16 into the desired shape.

Light-directing structures are well-known to persons of skill in the art. There are various ways of accomplishing this. In one embodiment, the light-directing structure includes a plurality of notches disposed along the waveguide. Similarly, one could use paint as indicated at 20 in FIG. 2C. Stippling portions of the waveguide is another option.

Figure 3:
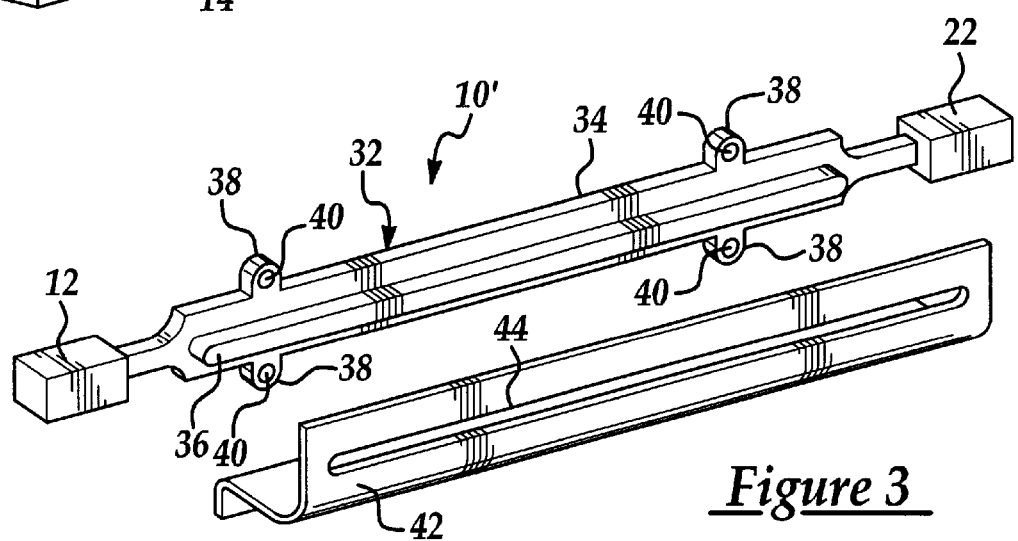
FIG. 3 shows an alternative embodiment of the invention.

In another possible embodiment, shown at 10' in FIG. 3, the waveguide, generally shown at 32, has an elongated base section 34 and a longitudinally-extending raised portion 36 projecting from the base section. The base section 34 includes a plurality of tabs 38 extending away from the base section, with a mounting hole 40 extending through each tab. As shown, there is at least one illumination source 12, 22 disposed adjacent the waveguide 32.

This embodiment also includes a panel 42 defining an opening 44 having the shape of the raised portion 36, where the panel 42 extends over at least a portion of the waveguide 32 with the raised portion 36 fitting in the opening 44. Light from the waveguide 32 emanates from the opening 44.

The ends of the waveguide 32 could be keyed, together with openings in the enclosures 12, 22, as in the previously-covered embodiments. But this is not strictly necessary. The base section 32 includes a flat surface adapted to engage a corresponding flat surface in the predetermined location when the illumination assembly 10' is installed in the predetermined location.

Because of this, and because of the raised portion 36, the waveguide can be installed in only one orientation relative to the enclosures 12, 22. Further, the raised portion 36 is, in a sense, keyed to the panel 42. This is why further keying is not necessary in this embodiment. This embodiment may further include some notching, paint, or stippling to enhance light control.

There is also a corresponding method for producing a waveguide assembly 10 that includes an elongated waveguide 16 and a light source assembly supported in an enclosure 12. The method includes the basic steps of: modifying the waveguide 16 to include light-directing structure 20 along the waveguide to direct light out of the waveguide in a predetermined direction; forming an opening 14 in the enclosure 12 to receive and support an end 18 of the waveguide 16, the opening 14 having a predetermined shape; and forming the end 18 of the waveguide 16 to have a corresponding shape, where the shapes of the opening 14 and the end 18 permit mating of the end into the opening in only one rotational orientation.

The step of forming the end 18 of the waveguide 16 preferably includes the steps of applying heat to the end 18 of the waveguide 16, inserting the end 18 of the waveguide 16 into a die 30, and forming the end 18 of the waveguide 16 in the corresponding shape. This has already been discussed in connection with FIG. 2. The forming may also be accomplished by injection molding the waveguide 16 so that its ends have the desired shape.

As mentioned above, the step of modifying the waveguide 16 includes at least one of the steps of: notching portions of the waveguide 16; painting portions of the waveguide 16; and stippling portions of the waveguide 16. Other ways of modifying the waveguide may be known to persons of skill. None are particularly preferred at this time.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. An illumination assembly comprising:
    an enclosure operative to support an illumination source, the enclosure defining at least one opening; and
    at least one elongated waveguide having a first end disposed in the opening of the enclosure, and a spaced-apart second end, the waveguide including light-directing structure operative to direct light out of the waveguide in a predetermined direction;
    the first end and the opening each being shaped so that the first end of the waveguide may be inserted into the opening of the enclosure in only one rotational orientation, whereby the rotational orientation of the light-directing structure is fixed relative to the enclosure.

2. The assembly of claim 1 including a second enclosure operative to support an illumination source and defining an opening, the second end of the waveguide being disposed in the opening.

3. The assembly of claim 2 including a support disposed along the waveguide between the first enclosure and the second enclosure.

4. The assembly of claim 3 wherein the support is made from a material that permits light to pass through.

5. The assembly of claim 1 wherein the first end of the waveguide is deformed from its original shape to a shape matching the shape of the opening.

6. The assembly of claim 1 wherein the light-directing structure includes a plurality of notches disposed along the waveguide.

7. The assembly of claim 1 wherein the light-directing structure includes paint disposed along portions of the waveguide.

8. The assembly of claim 1 wherein the light-directing structure includes stippling disposed along portions of the waveguide.

9. An illumination assembly for installing in a predetermined location to illuminate a target at a selected position, the illumination assembly comprising:
    at least one elongated waveguide having a first end and a spaced-apart second end, the waveguide including light-directing structure operative to direct light out of the waveguide in a predetermined direction;
    an illumination source disposed adjacent the waveguide;
    a support structure associated with the waveguide that is operative to support the waveguide in a predetermined operating location relative to the target;
    wherein the waveguide mates with at least one of the illumination source and the support structure in only a single angular orientation with the waveguide being oriented in a predetermined angular alignment relative to the target when the illumination assembly is installed at the predetermined operating location.

10. An illumination assembly comprising:
    an elongated waveguide having a base section and a longitudinally-extending raised portion projecting from the base section, the base section including at least one mounting hole adapted to receive a fastener for mounting the waveguide in a predetermined location;

at least one illumination source disposed adjacent the waveguide.

11. The illumination assembly of claim 10 further comprising a panel defining an opening having the shape of the raised portion, the panel extending over at least a portion of the waveguide with the raised portion fitting in the opening.

12. The illumination assembly of claim 10 further including a plurality of tabs extending away from the base section, with a mounting hole extending through each tab.

13. The illumination assembly of claim 10 wherein the base section includes a flat surface adapted to engage a corresponding flat surface in the predetermined location when the illumination assembly is installed in the predetermined location.

14. A method for producing a waveguide assembly that includes an elongated waveguide and a light source assembly supported in an enclosure, the method includes the steps of:

modifying the waveguide to include light-directing structure along the waveguide to direct light out of the waveguide in a predetermined direction; providing an opening in the enclosure to receive and support an end of the waveguide, the opening having a predetermined shape; and forming the end of the waveguide to have a corresponding shape, where the shapes of the opening and the end permit mating of the end into the opening in only one rotational orientation.

15. The method of claim 14 wherein the step of forming the end of the waveguide includes the steps of applying heat to the end of the waveguide, inserting the end of the waveguide into a die, and forming the end of the waveguide in the corresponding shape.

16. The method of claim 14 wherein the step of modifying the waveguide includes at least one of the steps of: notching portions of the waveguide painting portions of the waveguide; and stippling portions of the waveguide.

17. An illumination assembly for mounting on a supporting structure of a vehicle, comprising:

an enclosure operative to support an illumination source, the enclosure being configured to mount on the supporting structure and having at least one opening; and at least one elongated waveguide having a first end disposed in the opening of the enclosure, and a spaced-apart second end, the waveguide being supported at two or more spaced locations along its length and including light-directing structure operative to direct light out of the waveguide at one or more locations along its length;

the first end and the opening each having a complementary shape such that the first end of the waveguide may be inserted into the opening of the enclosure in only one rotational orientation, wherein the light-directing structure is located on the waveguide such that, when the first end is mated with the opening in the enclosure and the enclosure is mounted to the supporting structure, the light-directing structure is oriented to provide illumination in a predetermined direction relative to the supporting structure.

18. The assembly of claim 17, including a second enclosure operative to support an illumination source and defining an opening, the second end of the waveguide being disposed in the opening.

19. The assembly of claim 18, including a support disposed along the waveguide between the first enclosure and the second enclosure.

20. The assembly of claim 17, wherein the light-directing structure includes a plurality of notches disposed along the waveguide.

21. The assembly of claim 17, wherein the light-directing structure includes paint disposed along portions of the waveguide.

22. The assembly of claim 17, wherein the light-directing structure includes stippling disposed along portions of the waveguide.

* * * * *